United States Patent
Zhao et al.

(10) Patent No.: US 10,534,671 B1
(45) Date of Patent: Jan. 14, 2020

(54) CONTAINER IMAGE LAYER COMPACTION

(71) Applicant: EMC Corporation, Hopkinton, MA (US)

(72) Inventors: Accela Zhao, Shanghai (CN); Yu Cao, Beijing (CN); Layne Peng, Shanghai (CN); Junping Zhao, Beijing (CN); Kenneth Durazzo, San Ramon, CA (US)

(73) Assignee: EMC IP Holding Company LLC, Hopkinton, MA (US)

(*) Notice: Subject to any disclaimer, the term of this patent is extended or adjusted under 35 U.S.C. 154(b) by 370 days.

(21) Appl. No.: 15/195,451

(22) Filed: Jun. 28, 2016

(51) Int. Cl.
G06F 17/00 (2019.01)
G06F 7/00 (2006.01)
G06F 11/14 (2006.01)

(52) U.S. Cl.
CPC ...... *G06F 11/1451* (2013.01); *G06F 2201/80* (2013.01)

(58) Field of Classification Search
CPC .................. G06F 11/1451; G06F 2201/80
USPC ............................................. 707/640
See application file for complete search history.

(56) References Cited

U.S. PATENT DOCUMENTS

| | | | |
|---|---|---|---|
| 6,285,995 B1* | 9/2001 | Abdel-Mottaleb | G06F 16/5838 707/737 |
| 7,076,509 B1* | 7/2006 | Chen | G06F 3/0605 |
| 7,165,079 B1* | 1/2007 | Chen | G06F 16/10 |
| 7,865,472 B1* | 1/2011 | Orcutt | G06F 11/1469 707/640 |
| 9,298,561 B1* | 3/2016 | Sawhney | G06F 11/1469 |
| 2005/0071781 A1* | 3/2005 | Atkins | G06F 17/509 715/838 |
| 2006/0200758 A1* | 9/2006 | Atkins | G06T 11/60 715/209 |
| 2007/0081088 A1* | 4/2007 | Gotoh | G06F 16/58 348/333.01 |
| 2008/0133622 A1* | 6/2008 | Brown | G06F 11/1458 |
| 2013/0110784 A1* | 5/2013 | Guo | G06F 11/1448 707/649 |
| 2016/0239388 A1* | 8/2016 | Joseph | G06F 11/1464 |

(Continued)

OTHER PUBLICATIONS

P. Mell et al., "The NIST Definition of Cloud Computing," U.S. Department of Commerce, Computer Security Division, National Institute of Standards and Technology, Special Publication 800-145, Sep. 2011, 7 pages.

*Primary Examiner* — Pavan Mamillapalli
(74) *Attorney, Agent, or Firm* — Ryan, Mason & Lewis, LLP

(57) ABSTRACT

A method for managing container images in a container hosting environment, comprising a set of machine nodes for hosting container images, comprises the following steps. At a machine node of the set of machine nodes, at least one image layer of a container image comprising multiple image layers is identified for compaction. The identified image layer is compacted by merging data of the identified layer with data of another image layer of the container image. The data of the compacted image layer is transmitted to a backup store remote from the machine node for storage. The set of machine nodes and the backup store are implemented via processing devices operatively coupled via a communication network to form the container hosting environment. The compacted image layer may then be recovered from the backup store.

20 Claims, 7 Drawing Sheets

(56) References Cited

U.S. PATENT DOCUMENTS

2016/0292048 A1* 10/2016 Dolan ................... G06F 3/0608
2016/0328841 A1* 11/2016 Lay ....................... G06T 7/0012
2016/0359955 A1* 12/2016 Gill ..................... H04L 67/1097

* cited by examiner

CONTAINER IMAGE LAYER COMPACTION

FIELD

The field relates generally to computing environments, and more particularly to container image processing in such computing environments.

BACKGROUND

Computing environments, such as data centers, frequently employ cloud computing platforms, where "cloud" refers to a collective computing infrastructure that implements a cloud computing paradigm. For example, as per the National Institute of Standards and Technology (NIST Special Publication No. 800-145), cloud computing is a model for enabling ubiquitous, convenient, on-demand network access to a shared pool of configurable computing resources (e.g., networks, servers, storage, applications, and services) that can be rapidly provisioned and released with minimal management effort or service provider interaction. Cloud-based data centers are deployed and managed by cloud service providers, who provide a computing environment for customers (tenants) to run their application programs (e.g. business applications or otherwise). Such cloud computing platforms may be implemented at least in part utilizing one or more virtual compute elements such as one or more virtual machines (VMs) or one or more containers. By way of example, one commonly used type of container is a Docker container.

Containers benefit application packaging and delivery and also have smaller runtime footprints compared to VMs. Thus, an increasing amount of applications adopt containers as their hosting environment. A running container is launched from a container image. A container image is made up one or more image layers. The devices hosting the applications (host devices or machine nodes) obtain container image layers by pulling them from an image registry. In a large-scale data center deployment, the number of image layers being pulled and processed can be quite large. A large number of image layers bring significant performance and storage penalties, especially in the large-scale data center deployment where duplicate image layers can be stored in each machine node.

SUMMARY

Embodiments of the invention provide techniques for container image layer compaction. For example, in one embodiment, a method for managing container images in a container hosting environment, comprising a set of machine nodes for hosting container images, comprises the following steps. At a machine node of the set of machine nodes, at least one image layer of a container image comprising multiple image layers is identified for compaction. The identified image layer is compacted by merging data of the identified layer with data of another image layer of the container image. The data of the compacted image layer is transmitted to a backup store remote from the machine node for storage. The set of machine nodes and the backup store are implemented via processing devices operatively coupled via a communication network to form the container hosting environment. The compacted image layer may then be recovered from the backup store.

Advantageously, illustrative embodiments automatically manage the compaction of container image layers, recover them when needed again, and transparently reorganize an image layer tree to fit best performance versus storage efficiency trade-offs. The compaction techniques improve ease of management and improve performance and storage efficiency. Furthermore, the compaction techniques are compatible with current container technologies and transparent to end-users.

These and other features and advantages of the invention will become more readily apparent from the accompanying drawings and the following detailed description.

DETAILED DESCRIPTION

Illustrative embodiments may be described herein with reference to exemplary cloud infrastructure, data repositories, data centers, data processing systems, computing systems, data storage systems and associated servers, computers, storage units and devices and other processing devices. It is to be appreciated, however, that embodiments of the invention are not restricted to use with the particular illustrative system and device configurations shown. Moreover, the phrases "cloud environment," "cloud computing platform," "cloud infrastructure," "data repository," "data center," "data processing system," "computing system," "data storage system," "data lake," and the like as used herein are intended to be broadly construed, so as to encompass, for example, private and/or public cloud computing or storage systems, as well as other types of systems comprising distributed virtual infrastructure. However, a given embodiment may more generally comprise any arrangement of one or more processing devices.

As mentioned above, there is an increasing trend to host production application programs (applications) in containers. Containers benefit application packaging and delivery. For example, at runtime, a container consumes fewer resources than a virtual machine (VM), and has faster launch and termination speeds. Containers are a foundational component in Platform as a Service (PaaS) frameworks such as CloudFoundry (CF), Kubernetes (K8S) and Mesos. By way of example, one commonly used type of container is a Docker container. While Docker is considered a standard of container technology; it is to be appreciated that illustrative embodiments are applicable to general container technology beyond Docker.

In a cloud computing platform, a cluster of host devices or machine nodes (hosts) that use containers to host applications is referred to as a container hosting environment.

A running (executing) container is launched from its container image. Before a container is launched, the host needs to obtain the corresponding container image. This is accomplished by a machine node obtaining one or more container image layers from an image registry. In a PaaS framework that constantly launches, terminates, and re-launches applications, such as Mesos, machine nodes have more need to pull (obtain) images because new applications may be scheduled to run on them. This leads to a significant number of images, many times duplicates, being processed in the container hosting environment.

Figure 1:
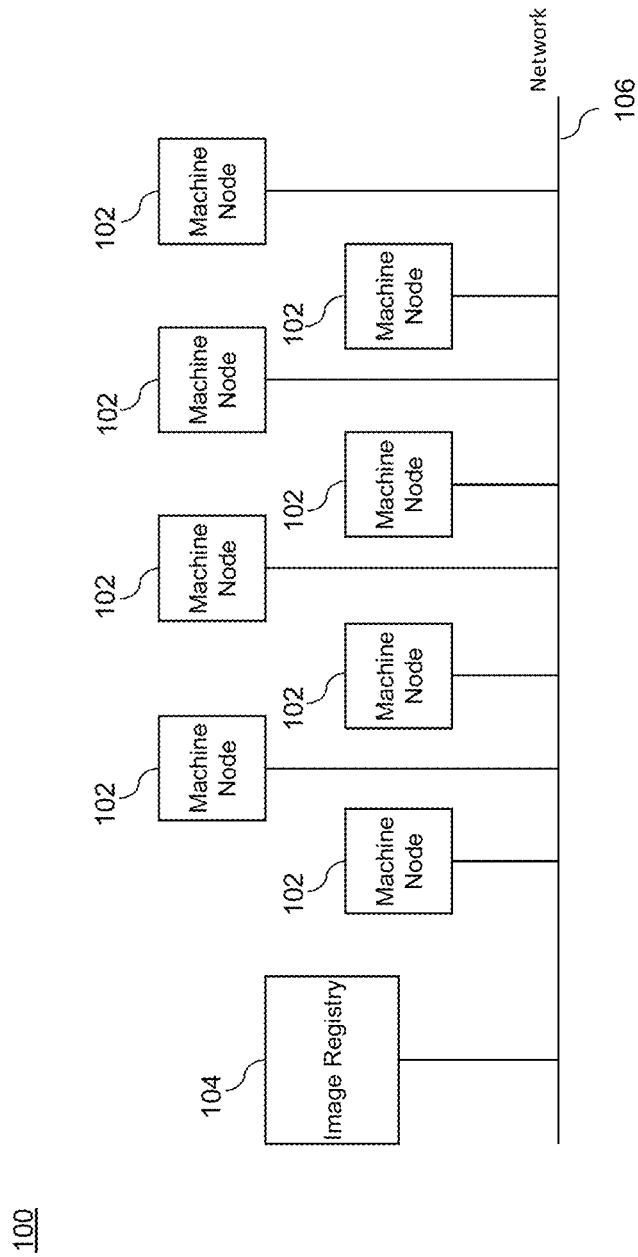
FIG. 1 illustrates a container hosting environment in accordance with which one or more embodiments of the invention will be described.

An exemplary container hosting environment is depicted in FIG. 1. As shown, a container hosting environment 100 comprises a plurality of machine nodes (hosts) 102 operatively coupled to a container image registry 104 via a network 106. This configuration depicts most PaaS platforms as mentioned above.

A machine node is a worker or compute node where a container runs to host an application. Container image registry 104 stores the container images. Machine nodes 102 and image registry 104 are inter-connected by a network 106. Prior to launching a container, the machine node 102 needs to pull a corresponding container image from image registry 104. The act of pulling a container image consumes resources, such as network bandwidth, CPU (central processing unit), memory, disk input/output (IO), on both the puller side (machine node) and pullee side (image registry). In a Docker implementation, the image registry 104 is considered a Docker hub, and the machine nodes are considered Docker clients.

Figure 2:
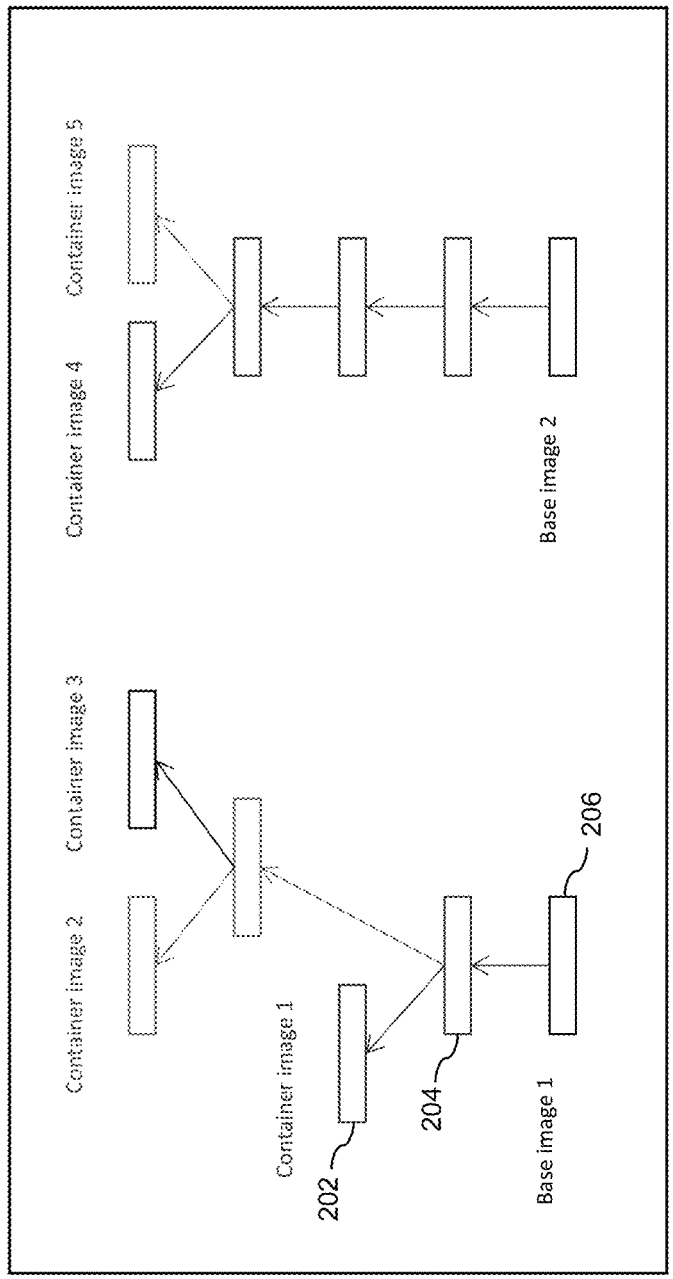
FIG. 2 illustrates container image layers in accordance with which one or more embodiments of the invention will be described.

FIG. 2 illustrates container image layers. In a Docker container implementation, a container image is structured as a chain of layers. Each new modification to an existing layer is represented as a new layer, added on top of its parent. Layers can branch, and containers may share their parent layers. The container images (1 through 5) can be seen as a forest of layers 200 as shown in FIG. 2. By way of example only, container image 1 is comprised of layers 202, 204 and 206, with 206 being a base image layer ("parent"). Note how other container images share the same layers and even the same base image layer (e.g., container images 1, 2 and 3 share the same base image layer 1, while container images 4 and 5 share the same base image layer 2).

Taking Docker again as an example, it is very easy to generate a large amount of image layers, for example when building a complex Dockerfile, or iteratively developing an application image. Complex image layer trees, like those shown in FIG. 2 or even more complex, cause significant performance overhead as well as waste storage. Also, the same image layers may typically be stored repeatedly on each machine node. As such, there is a huge amount of duplicated data in a large-scale container deployment such as a data center.

To address these and other problems in container hosting environments, illustrative embodiments realize that image layer compaction support is desirable. Secondly, it is realized that the compaction management should be automatic. Thirdly, it is realized that the structure of an image layer tree can either be flattened or deepened to trade-off between performance and storage efficiency. Lastly, it is realized that the overall design should be compatible with existing container technologies.

More particularly, illustrative embodiments, as will be described herein, automatically detect and compact appropriate container image layers. The image layers are moved to a highly cost-efficient backup store, in case they need to be recovered later. During an iterative compaction and recovery process, the structure of an image layer tree can be "stretched," i.e., flattened or deepened, according to the performance versus storage efficiency trade-offs the user desires.

Illustrative embodiments provide many advantages. For example, the problem of having too many image layers is addressed, which improves performance and saves storage, especially in large-scale deployments. The backup store is organized to be very cost-efficient and naturally de-duplicated. The structure of an image layer tree is iteratively reorganized (flattened or deepened), according to user policies, to achieve better performance or storage efficiency. The overall design is compatible with existing container technology.

Container technology is increasingly adopted in datacenters. It is not uncommon to see large-scale deployment. The most adopted container technology is Docker.

Thus, to reiterate, a container and its image have certain characteristics:

An image is composed of a series of images layers. Each layer records its data deltas (i.e., data changes) from its parent.

Different images may reuse certain layers; which form a tree structure.

Each image and image layer is respectively assigned a universally unique identifier (UUID) which never changed. Typically, an image layer is also considered an image (in Docker implementations).

Image layer data is always read-only and never changed. New writes append to a new image layer.

A running container may changes its data, i.e., new data deltas. It can be committed, and become a new image layer based on its parent.

However, the container images layer system has its natural problems. Below, such problems within the illustrative context of a Docker implementation are further highlighted.

The first problem is too many image layers. This problem is two-fold.

First, as mentioned above, a Docker implementation typically generates a large amount of image layers. When an image is built from a Dockerfile, each command generates a new image layer. Thus, when creating a complex image consisting of hundreds of commands, hundreds of image layers are generated. When a running (executing) container is committed, it becomes a new image layer. Developers typically repeatedly execute a container, check for problems, modify the container, commit to image, and then re-execute. The commit image step cannot be omitted because many systems only accept an image rather than an already running container. This repeatedly creates a large amount of image layers. Further, each application's Docker image may consist of a large number of its own layers, and a large number of layers from its base operating system (OS). In a large-scale deployment, there are too many different running application containers, and thus too many image layers.

Second, image layers bring performance penalty and storage waste. A Docker implementation uses an advanced multi layered unification file system (AUFS) or a device-mapper to implement image layers; the former is a filegranularity overlay file system, and the latter uses snapshots. Read performance is greatly impacted if a machine node needs to search through a deep image layer tree. Even for a devicemapper driver, ten percent performance degradation is typically expected given a 4-5 layer image structure. A Docker image can have tens to hundreds of image layers. Intermediate image layers waste storage space. If data is changed from D1→D2→D3, only D3 is the latest data set; thus storing the intermediate D2 data set is wasteful. Even worse, in some cases, each machine node has one copy of the same intermediate layer; and thus the storage waste in a 1000-node deployment is 1000 fold. Still worse, deleting a top or base image layer does not actually delete all data, because the intermediate layers are still holding data. For example, if a large file is added in one layer, then deleted in the next layer; the data still exists in the layer where it was originally added thus wasting valuable storage space.

Still further, it is realized herein that the more image layers there are in a deployment, the more fragmentation, and the worse read performance becomes. The data scatters across each layer; and thus underlying allocated disk space is not contiguous, which results in poor read performance. This is also a common problem when managing long snapshot chains in storage systems. In addition, each image layer has its own metadata. Metadata is typically required to remain in-memory (local to the machine node). Thus, more metadata consumes more storage space.

Usually the data associated with a running container is also implemented as an (hidden) image layer (when the container is committed, that image layer is shown to end-user). When the running container modifies existing data, it first needs to search and copy that data block from underlying intermediate image layers, and then write them as new data blocks.

It is realized herein that if the image layer depth is smaller, the overhead of the search-and-copy operation is smaller. Also, if more data blocks exist in the top image layer, i.e. more flattening, the overhead of the search-and-copy operation is smaller.

A second problem with a Docker implementation is the lack of automatic image layer compaction management. With respect to existing image layer compaction, Docker provides a tool to squash the image. A CloudFoundry container image is different. It only contains two layers: one for the OS and one for the application. While CloudFoundry does not have the "too many" image layers problem, it does lack the benefits of the image layering approach of Docker.

Figure 3A:
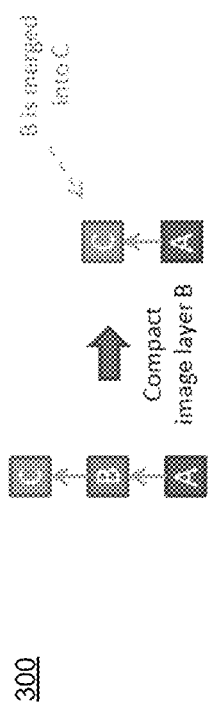
FIG. 3A illustrates container image layer compaction, according to an embodiment of the invention.

As will be described herein, illustrative embodiments provide automatic image layer compaction management that automatically identifies which image layer is appropriate to be compacted, and then compacts the image layer. By "compact," it is meant that this image layer is merged to its immediate child layer, so that the depth of the complete image layer chain is reduced by one. The original image layer being compacted is then removed from the tree structure. For example, A→B→C is compacted into A→C; B is compacted, or B is merged to C. This compaction is illustrated by example 300 in FIG. 3A.

Another important point is that the compacted image layer may be again needed in the future. Assume, as in FIG. 3A, that image layers include A→B→C, B is compacted, then it becomes A→C. But assume later that a machine node pulled image layer D from the image repository (104 in FIG. 1), such that A→B→D. Thus, B is needed again. The image layer compaction management should be able to recover an already compacted image layer, when it is needed again.

A third problem with the existing Docker implementation is the lack of dynamic image layer tree scheduling. Image layers, because of their dependency, form a tree structure. Each image layer is essentially the data delta from its parent. A deeper image layer tree yields more performance penalty. But actually an image layer can be rebased to its more former ancestor, to cut down the depth. The trade-off is that more storage space needed, since the rebased layer needs to merge with the intermediate data delta. This is illustrated in example 310 in FIG. 3B.

Figure 3B:
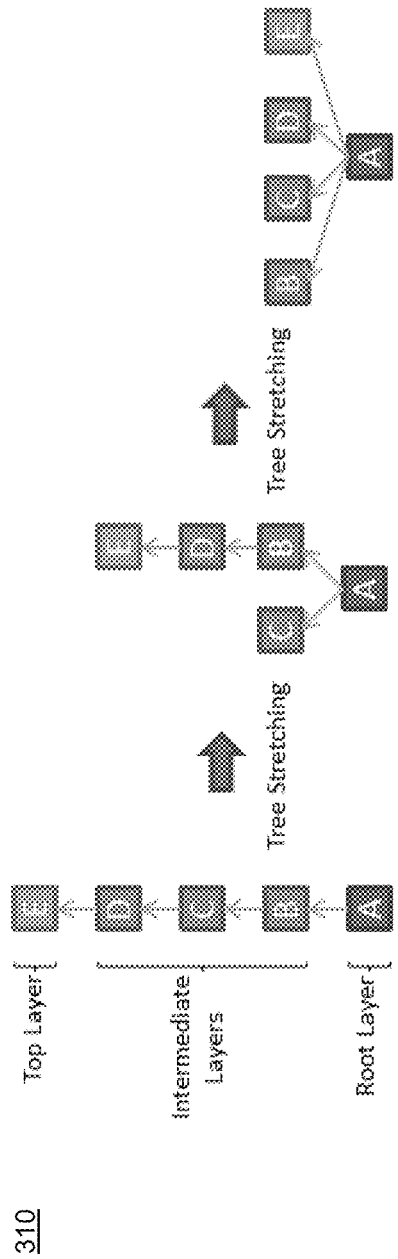
FIG. 3B illustrates container image layer tree stretching, according to an embodiment of the invention.

For example, in FIG. 3B, the leftmost tree is the deepest. Then layer C is rebased to B, resulting in the tree in the middle. The tree becomes less deep, but the trade-off is that layer C now also contains data delta of both B and the original C, resulting in more disk space being needed (D contains data delta of the original D and the original C). With respect to the rightmost tree, all layers are rebased to root layer A. The tree is shorter, but results in the most disk space needed because layer C, D, E now contains redundant data delta. Thus, in FIG. 3B, from left to right, the tree becomes more flattened. This process is referred to herein as tree stretching. Accordingly, when deciding how to organize the tree structure of image layers, the following options (with trade-offs) are:
  Keep the tree deeper, so that each image layer only needs to record its own data delta, and less storage space is needed. However, performance is worse. This is how Docker organizes its image layers.
  Rebase the image layer and make the tree less deep. The benefit is better performance; the trade-off is more storage space is needed. Following this process, the image layer tree becomes more flattened (tree stretching).
  The above layer operation is transparent to the container runtime, i.e., Docker. The former uses an image layer ID to locate each layer. As long as the layer exposes the same data, Docker is not affected.

In summary, dynamic image layer tree stretching according to embodiments of the invention enable to:
  Automatically decide how flat the image layer tree should be, and when to move those image layers. The trade-off between disk space and read/write performance should be balanced.
  Automate the process of making the image layer tree more flattened or deeper; dynamically adjust tree structure in runtime. By "flatter" or more "flattened," it is meant that one or more layers of the tree are re-organized in a horizontal relationship with respect to one or more other layers of the tree, while "deeper" or more "deepened" means that one or more layers of the tree are re-organized in a vertical relationship with respect to one or more other layers of the tree.

The existing container technologies, taking Docker as an example, do not provide compaction functionality. The image layer tree is always fixed in existing Docker technology, i.e., no disk space or performance trade-off is considered and thus compaction cannot be adjusted.

While solving the above problems, it is further realized that illustrative embodiments should be compatible with current container technologies. The concepts of an image repository, an image, an image layer, and a running container, should be the same. The changes should be transparent to the end-user.

Illustrative embodiments provide a method and framework for automatic management of container image layer compaction. As will be explained, illustrative embodiments detect and decide which image layer is appropriate for compaction, with customizable policies. The image layer compaction is automatically carried out, which solves the problem of "too many" image layers. The compacted image layer is removed from the container runtime, but stored in a backup store, which is extremely cost efficient. Later, when the image layer is needed again, it can be recovered. During the compaction and recover process, the stretching of an image layer tree is dynamically managed. The entire solution is compatible with current Docker technology, and is transparent to end-user.

Figure 4:
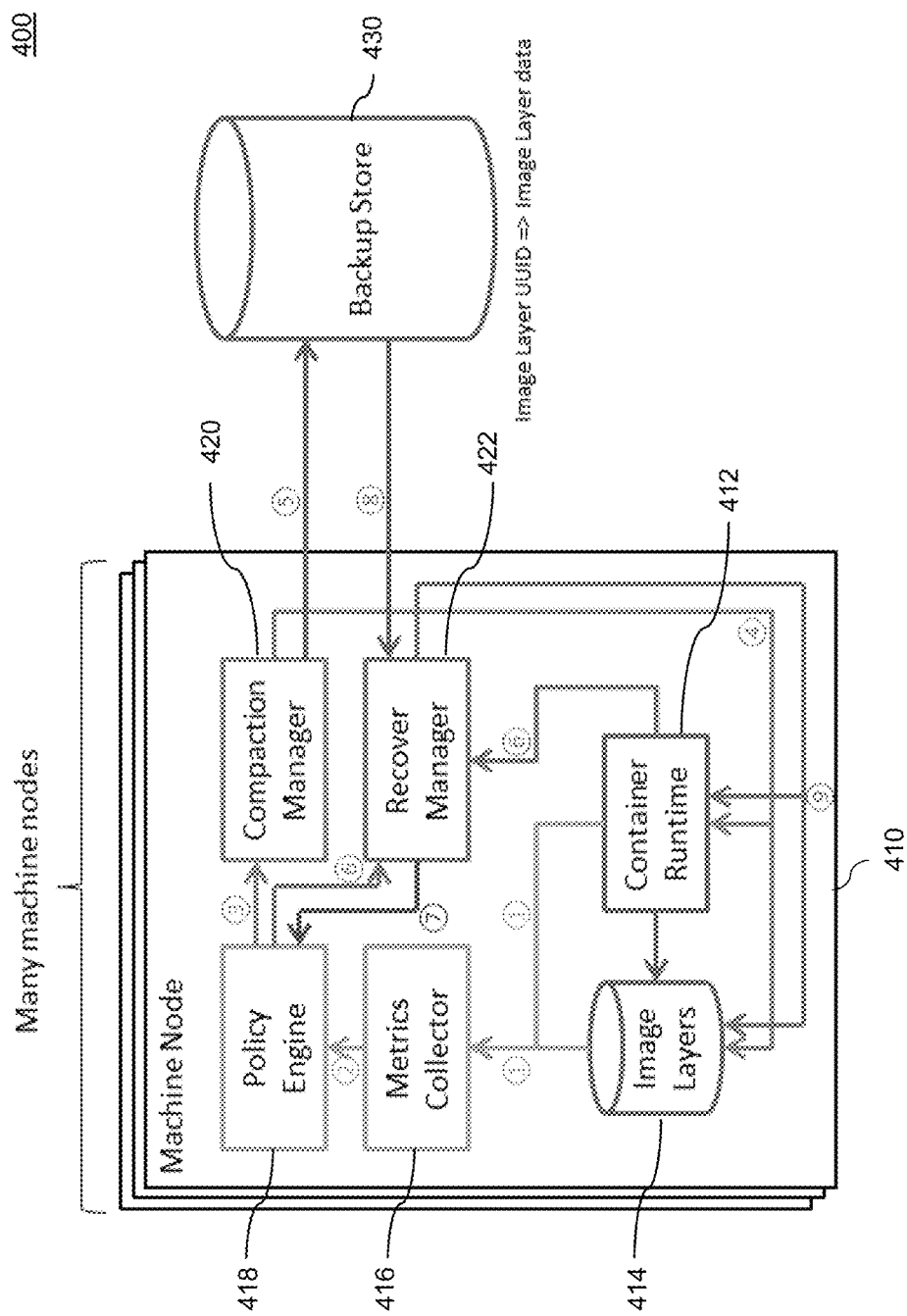
FIG. 4 illustrates machine node architecture environment with container image layer compaction functionality, according to an embodiment of the invention.

FIG. 4 illustrates machine node architecture environment with container image layer compaction functionality, according to an embodiment of the invention. As shown in environment 400, each machine node 410 (e.g., machine node 102 in FIG. 1) comprises a container runtime 412, image layers store 414, a metrics collector 416, a policy engine 418, a compaction manager 420, and a recover manager 422. A backup store 430 is operatively coupled to each machine node 410. Thus, as illustrated, the compaction architecture runs separately on each machine node, and there is no central control. All instances connect to backup store 430. An explanation of each architecture component will now be given.

Container runtime 412 is the existing part of current container technology. For example, container 412 comprises the Docker client software, and Docker service process software.

Image layers store 414 is also an existing part of current container technology. This is where the image and image layer data are stored. In a Docker implementation, they are stored on local disk.

Metrics collector 416 collects necessary data to help policy engine 418 make decisions, for example, the child count of an image layer, how hot is the layer read (for Docker, image layer is read-only; write would be always appended to the new layer), etc. It is to be understood that the determination as to which metrics to collect can be customizable in one embodiment.

Policy engine 418 determines what image layer to compact, and when to compact it. The policy (decision rules) is customizable, and not limited to the examples given herein. By way of one example only, a rule can specify: if for a predetermined length of time an image layer only has very few (predetermined) reference counts, then compact the image layer; but if an image layer is heavily read (predetermined count), its children should be considered for compaction. Policy engine 418 also acts to determine which image layer to recover, and when to recover it. Further, as will be explained below, policy engine 418 also helps recover manager 422 to determine the recovery strategy.

Compaction manager 420 automates the process of compacting the specified image layer. Once triggered by policy engine 418, compaction manager 420 compacts the image layer (i.e., merge subject layer to its child layer and remove the subject layer from layer tree). The compacted image layer is moved to backup store 430, so that it can be recovered later.

Recover manager 422 automates the process of recovering an already compacted image layer. The recover manager 422 can be triggered when container runtime 412 needs that image layer but cannot find it locally, or policy engine 418 determines that it should be recovered. The image layer is returned back from backup store 430, and then inserted into the original image layer tree. The recovery strategy can vary: inserting B to A→C can be either A→B C, or A→B & A→C. The decision whether to make the tree structure deep or flat, this is where dynamic layer tree stretching comes into effect.

Backup store 430 is where the compacted image layers are stored. Since container runtime 412, e.g. Docker, always references image layers with UUIDs, image layers can be stored and searched with UUID in backup store 430. Since the same image layers on different machine nodes share the same UUID, image layers stored in backup store 430 are naturally de-duplicated. Backup store 430 can be archive storage, which is optimized to be extremely cost efficient for cold data.

FIG. 4 also illustrates an overall workflow via the numbered steps 1 through 9. Most steps can take place concurrently and iteratively. Below is one illustration of the workflow with the numbers referring to the numbered steps in the figure.

1. The metrics data related to image layer compaction or recovery is collected by metrics collector 416.
2. Policy engine 418 uses the collected metrics data to make decisions.
3. When policy engine 418 determines the appropriate time, it triggers compaction manager 420 to perform an image layer compaction.
4. Compaction engine 420 carries out the image layer compaction, and interacts with both container runtime 412 and image layers store 414. If container runtime 412 provides an application programming interface (API) to compact certain image layers, the compaction manager 420 uses the API; otherwise, compaction manager 420 operates on image layers (from store 414) directly in a transparent manner with respect to container runtime 412.
5. The compacted image layer is moved to backup store 430.
6. When container runtime 412 needs an image layer but cannot find it, or policy engine 418 determines that it is time to recover an image layer, recover manager 422 is triggered.
7. Recover manager 422 queries policy engine 418 to determine the appropriate recovery strategy.
8. Recover manager 422 retrieves the image layer from backup store 430.
9. Recover manager 422 recovers the image layer, and inserts the recovered image layer into the original image layer tree. According to different recover strategies, recovered B to A→C can be A→B→C, or A→B & A→C.

Given the above-described architecture and workflow, some exemplary advantages of the image layer compaction approach according to illustrative embodiments will now be further explained.

The policy engine 418 uses collected metrics data to determine which image layer should be compacted. Once determined, the compaction manager 420 is triggered to compact that image layer. As mentioned above, an image layer is itself the data deltas from its parent. Thus, compaction merges the data deltas to its child. The original image layer is then removed from the image tree, and moved to backup store 430. What is exposed to the end-user is only the top image layer, so that compacting an intermediate image layer does not have any impact to the end-user. Container runtime 412, e.g. Docker, uses a UUID to locate an image layer and reads its data. Only a top image layer is directly used by the running container. Since the process according to illustrative embodiments does not change either the UUID or the data exposed in the child layers, container runtime 412 is not affected.

Image layer compaction according to illustrative embodiments automatically identifies when and which image layer to be compacted. The compaction process is automated, and the compacted image layer can be later recovered. The "too many" image layers problem is solved. Most image layers can be compacted. The machine nodes are saved from performance penalties and wasted storage space. The compaction is transparent to the end-user and the container runtime. When the compacted image layer is needed again, a recover process is provided.

Furthermore, as mentioned, the compacted image layers are moved into backup store 430. Since container runtime 412 uses UUIDs to locate each image layer (and a UUID is globally unique and never changes), illustrative embodiments use that UUID as the key to store and retrieve image layers in backup store 430. Some exemplary advantages are:

- The UUID helps to easily locate an image layer in backup store 430 when it needs to be recovered.
- The UUID is also used in container runtime 412, thus making the compaction approach according to illustrative embodiments compatible with existing container technology.
- Significant amounts of storage space are saved by deduplication. The same image layer always has the same UUID, which is guaranteed by container runtime 412. So, the same image layer is always saved only once in backup store 430, thus providing a natural deduplication. If there are 1000 machine nodes in a container hosting environment, the same image layer can be saved 1000 times on each machine; but after compaction and movement to backup store 430, the image layer is saved only once. This conserves a large amount of storage space.

Since the image layers in backup store 430 are considered cold data, high density compression and deduplication can be carried out. Backup store 430 can also be an archiving storage, which is optimized for cold data.

There can be times when an already compacted image layer is needed again. For example, assume a tree structure with image layers A→B→C, B is compacted, then it becomes A→C. But later the machine node pulled image D from image repository, i.e., A→B→D. B is then needed again.

In addition, policy engine 412 may also determine that an already compacted image layer is needed again. The rules can be customized. Sensible rules for a given machine node can be, for example, neighboring machine nodes are recovering that image layer, so recover it for the given machine node as well.

Figure 5A:
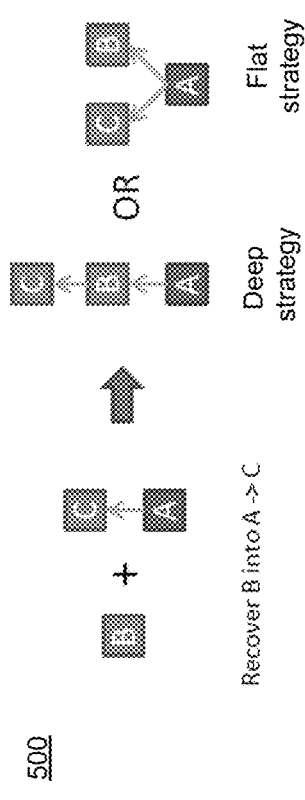
FIG. 5A illustrates container image layer recovery, according to one or more embodiments of the invention.

Recover manager 422 retrieves the needed image layer from backup store 430, and then recovers it. There are always two strategies of inserting the recovered image layer into the original image layer tree. FIG. 5A illustrates two strategies in example 500. Assume B is previously compacted and removed from A→C. Then, as shown in FIG. 5A, the two strategies can be:

Deep recovery strategy: B is inserted in the middle of A→C. The recovery process is slower, because C needs to rebase. But it needs less storage space overall, because now C only needs to store its own data deltas without B's. The resulting image layer tree is deeper, which yields more performance penalty.

Flat recovery strategy: B is rebased on A directly. Remember that the original tree structure before compaction is A→B→C. Even though now the container runtime 412 and the end-user will not see the internal differences, it consumes more storage space than the deep recovery strategy. The flat recovery process is faster, since C will not need to be rebased. The resulting image layer tree is shorter, which yields better performance.

Both recovery strategies can be used, and they are transparent to the container runtime or the end-user. Recover manager 422 asks policy engine 418 which strategy to select. The policy engine's rules are customizable. An illustrative rule can be, if A or C is read-hot, then use the flat strategy; if disk space is valuable, then use the deep strategy.

Advantages of image layer recovery include, but are not limited to:

- Since compacted image layers can be recovered again, the compaction process can then proceed without doubt.
- Recovery is on-demand, which saves unnecessary storage or computational overheads.
- More importantly, after compaction, the recovery strategies allow an image layer tree to re-organize between deep and flat, according to different trade-offs. This enables dynamic image layer tree stretching, as will be explained further below.

The compaction and recover process may happen repeatedly. An image layer can be compacted. When it is recovered again, different recovery strategies may be selected to balance the deep versus flat approaches. The recovered layer may not necessarily be inserted into the original position of the tree, rather it may be inserted into position to make the tree "stretch" to a flatter or deeper form. A flatter tree benefits performance, a deeper tree benefits storage saving. The stretching happens dynamically according to different trade-offs, to organize the tree into an optimal or otherwise preferred form.

Figure 5B:
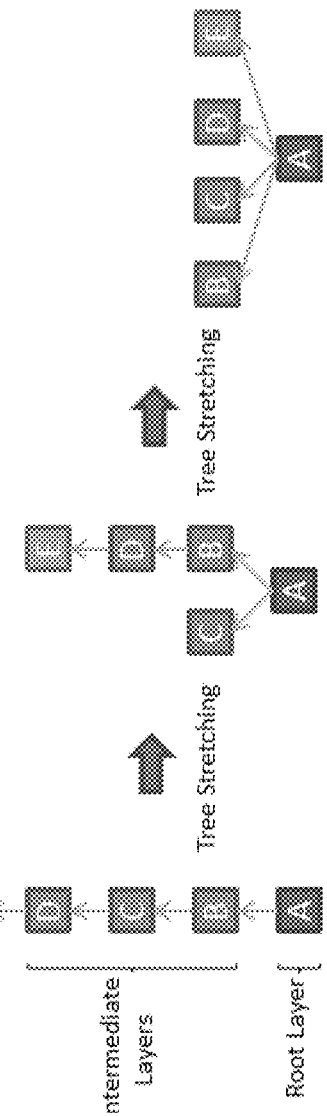
FIG. 5B illustrates dynamic container image layer tree stretching, according to an embodiment of the invention.

For example, FIG. 5B shows the stretching process in the context of example 510.

The initial image layer tree, leftmost, is A→B→C→D→E. E is the top layer, which is the only layer the end-user and container runtime 412 will be using directly.

After layer C is compacted and then recovered, the tree structure becomes the middle structure. Note that layer C does not return to the original position, since recover manager 422 and policy engine 418 decided to choose the flatter recovery strategy (whereby the tree is made flatter, and thus more beneficial for performance).

Gradually, after layers B and D are compacted and then recovered, the tree structure becomes the rightmost structure. How B and D should be inserted is not fixed, but rather recover manager 422 and policy engine 418 determine the respective strategies according to performance versus storage trade-offs. Rules are customizable, as mentioned above. For the example shown, a flatter tree form is selected.

The stretching process is dynamic and iterative. With layers repeatedly compacted and then recovered, the tree structure may take the form of any one of the tree structures shown in FIG. 5B (as well as forms not shown). The form is determined dynamically by policy engine 418 and recover manager 422 based on the best trade-off for performance versus storage space. The tree is re-organized to what is best based on the predetermined policy.

Advantages gained from the dynamic image layer tree stretching include, but are not limited to:

- The image layer tree of existing container technologies (e.g., Docker) is static and is always the deepest form. Illustrative embodiments make the tree structure dynamic, which iteratively re-organizes it towards either a flatter form or a deeper form. The policy engine 418 ensures the best trade-offs are made, so that the tree structure is always re-organized to what is best for performance versus storage, as the end-users want.

Illustrative embodiments provide for simple implementation with no central control necessary.

The image layer tree stretching is transparent to container runtime 412 and the end-user. What they need and actually see is the same image layer UUID and the same data content in each layer. Thus, the solution is compatible with existing container technologies.

Below an example is provided to illustrate how image layer compaction, recovery and tree stretching occurs using FIG. 5B.

Initially the image layer tree is organized as the leftmost tree structure. It is deep, where the extra B, C, D yields penalty on read performance, and wastes extra storage space since only E is actually used.

Compaction: Then, policy engine 418 decides that, according to user defined rules, image layer C is appropriate to be compacted. The image layer tree becomes A→B→D→E (not shown in FIG. 5B). Image layer C is moved to backup store 430, where it can be cost-efficiently and de-duplicatively stored. The compaction takes place in every machine node in a large-scale deployment, reducing the number of image layers, thus improving performance and storage efficiency.

Recovery: Later, assume the user pulled a new image from Docker Hub. Image layer C is needed again. Now recover manager 422 is triggered, it retrieves C from backup store 430, and inserts it again in the image layer tree. It is now A→C and A→B→D→E (the middle structure in FIG. 5B). The compaction and recovery are transparent, where the end-user and container runtime 412 do not need to care about what happens beneath the top layer.

Tree stretching: the image layer C is not in the original position (the middle structure in FIG. 5B). This is because when recovering, recover manager 422 and policy engine 418 decide they favor performance more than storage efficiency, according to user defined rules. So the recovery strategy inserts C directly on A, making the tree flatter.

More tree stretching: After iteratively compacting B, C, D, and then recovering them, their positions in the tree change. According to user defined rules, the tree is made more flat to favor performance over storage efficiency.

In accordance with the example above, these four aspects work together to provide various advantages for existing container technologies.

Figure 6:
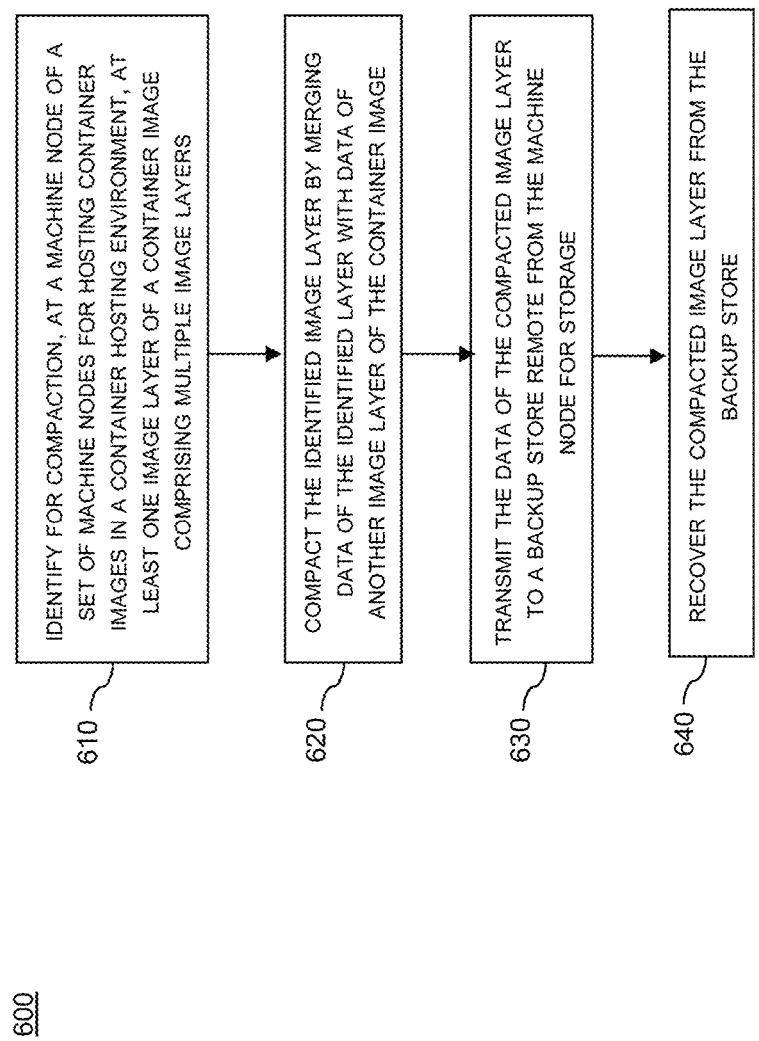
FIG. 6 illustrates a container image layer compaction methodology, according to an embodiment of the invention.

FIG. 6 illustratively summarizes a container image layer compaction methodology, according to an embodiment of the invention. For example, methodology 600 can be employed in container hosting environment 100 depicted in FIG. 1 as further illustrated in environment 400 in FIG. 4.

Step 610 identifies for compaction, at a machine node of a set of machine nodes for hosting container images in a container hosting environment, at least one image layer of a container image comprising multiple image layers.

Step 620 compacts the identified image layer by merging data of the identified layer with data of another image layer of the container image.

Step 630 transmits the data of the compacted image layer to a backup store remote from the machine node for storage.

Step 640 recovers the compacted image layer from the backup store.

Figure 7:
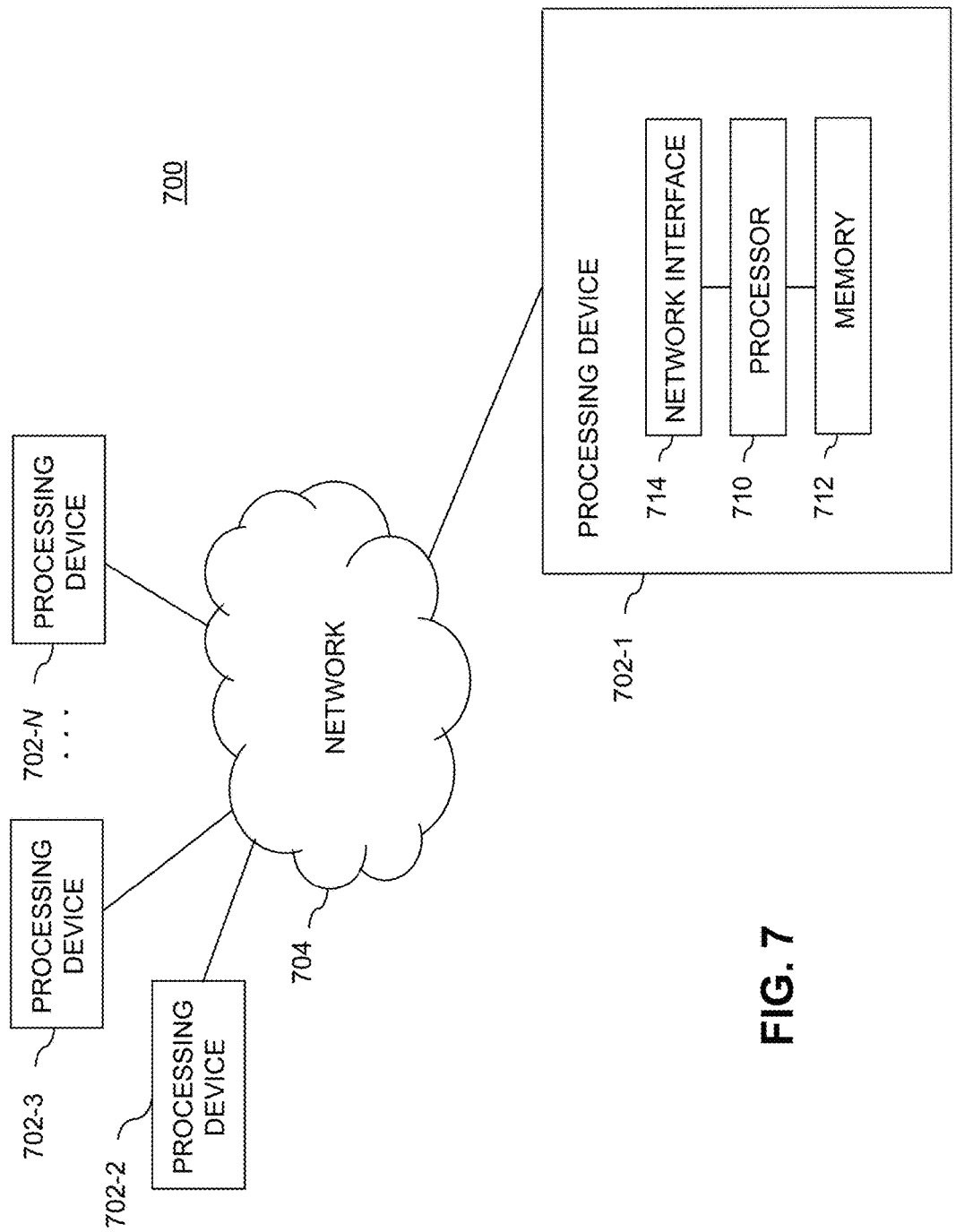
FIG. 7 illustrates a processing platform used to implement a container hosting environment with container image layer compaction functionality, according to an embodiment of the invention.

An example of a processing platform on which a computing environment such as a cloud computing platform with container image layer compaction functionality (e.g., 100 depicted in FIG. 1 as further illustrated in environment 400 in FIG. 4) can be implemented is processing platform 700 shown in FIG. 7. It is to be appreciated that processing platform 700 may implement the functionalities described herein.

The processing platform 700 in this embodiment comprises a plurality of processing devices, denoted 702-1, 702-2, 702-3, . . . 702-N, which communicate with one another over a network 704. It is to be appreciated that the methodologies described herein may be executed in one such processing device 702, or executed in a distributed manner across two or more such processing devices 702. It is to be further appreciated that a server, a client device, a computing device or any other processing platform element may be viewed as an example of what is more generally referred to herein as a "processing device." As illustrated in FIG. 7, such a device generally comprises at least one processor and an associated memory, and implements one or more functional modules for instantiating and/or controlling features of systems and methodologies described herein. Multiple elements or modules may be implemented by a single processing device in a given embodiment.

The processing device 702-1 in the processing platform 700 comprises a processor 710 coupled to a memory 712. The processor 710 may comprise a microprocessor, a microcontroller, an application-specific integrated circuit (ASIC), a field programmable gate array (FPGA) or other type of processing circuitry, as well as portions or combinations of such circuitry elements. Components of systems as disclosed herein can be implemented at least in part in the form of one or more software programs stored in memory and executed by a processor of a processing device such as processor 710. Memory 712 (or other storage device) having such program code embodied therein is an example of what is more generally referred to herein as a processor-readable storage medium. Articles of manufacture comprising such processor-readable storage media are considered embodiments of the invention. A given such article of manufacture may comprise, for example, a storage device such as a storage disk, a storage array or an integrated circuit containing memory. The term "article of manufacture" as used herein should be understood to exclude transitory, propagating signals.

Furthermore, memory 712 may comprise electronic memory such as random access memory (RAM), read-only memory (ROM) or other types of memory, in any combination. The one or more software programs when executed by a processing device such as the processing device 702-1 causes the device to perform functions associated with one or more of the components/steps of system/methodologies in FIGS. 1-6. One skilled in the art would be readily able to implement such software given the teachings provided herein. Other examples of processor-readable storage media embodying embodiments of the invention may include, for example, optical or magnetic disks.

Processing device 702-1 also includes network interface circuitry 714, which is used to interface the device with the network 704 and other system components. Such circuitry may comprise conventional transceivers of a type well known in the art.

The other processing devices 702 (702-2, 702-3, . . . 702-N) of the processing platform 700 are assumed to be configured in a manner similar to that shown for computing device 702-1 in the figure.

The processing platform 700 shown in FIG. 7 may comprise additional known components such as batch processing systems, parallel processing systems, physical machines, virtual machines, virtual switches, storage volumes, etc. Again, the particular processing platform shown in this figure is presented by way of example only, and the system shown as 700 in FIG. 7 may include additional or alternative processing platforms, as well as numerous distinct processing platforms in any combination.

Also, numerous other arrangements of servers, clients, computers, storage devices or other components are possible in processing platform 700. Such components can communicate with other elements of the processing platform 700 over any type of network, such as a wide area network (WAN), a local area network (LAN), a satellite network, a telephone or cable network, or various portions or combinations of these and other types of networks.

It should again be emphasized that the above-described embodiments of the invention are presented for purposes of illustration only. Many variations may be made in the particular arrangements shown. For example, although described in the context of particular system and device configurations, the techniques are applicable to a wide variety of other types of data processing systems, processing devices and distributed virtual infrastructure arrangements. In addition, any simplifying assumptions made above in the course of describing the illustrative embodiments should also be viewed as exemplary rather than as requirements or limitations of the invention. Numerous other alternative embodiments within the scope of the appended claims will be readily apparent to those skilled in the art.

What is claimed is:

1. A method for managing container images in a container hosting environment comprising a set of machine nodes for hosting container images, the method comprising:
   identifying for compaction, at a machine node of the set of machine nodes, at least one image layer of a container image comprising multiple image layers;
   compacting the identified image layer by merging data of the identified layer with data of another image layer of the container image;
   transmitting the data of the compacted image layer to a backup store remote from the machine node for storage; and
   recovering the compacted image layer wherein the recovering step comprises:
      obtaining the compacted image layer from the backup store; and
      inserting the recovered compacted image layer back into a tree structure in the container image from which the recovered compacted image layer originally came at a position other than an original position;
   wherein the set of machine nodes and the backup store are implemented via processing devices operatively coupled via a communication network to form the container hosting environment.

2. The method of claim 1, wherein the identifying step further comprises using a collected metric in accordance with a policy to identify the image layer of the container image to be compacted.

3. The method of claim 1, wherein the other image layer to which the identified image layer is merged is a child node to the identified image layer.

4. The method of claim 1, wherein the merged data is difference data relative to the identified image layer and the other image layer to which the identified image layer is compacted.

5. The method of claim 1, wherein the compacted image layer is stored in the backup store with an assigned universally unique identifier.

6. The method of claim 1, wherein the position in the container image at which the recovered image layer is inserted is determined based on a policy that considers computational performance versus storage efficiency at the machine node.

7. The method of claim 6, wherein the recovered image layer is inserted into the container image at a position that makes the container image deeper when storage efficiency is selected by the policy.

8. The method of claim 7, wherein the recovered image layer is inserted into the container image at a position that makes the container image flatter when computational performance is selected by the policy.

9. The method of claim 6, wherein the policy that considers computational performance versus storage efficiency at the machine node is dynamic.

10. The method of claim 1, wherein the compacting step is transparent to one or more of a runtime environment and an end-user of the container image.

11. An apparatus for managing container images in a machine node of a set of machine nodes for hosting container images in a container hosting environment, the apparatus comprising:
    a memory; and
    a processing device operatively coupled to the memory and configured to:
       identify for compaction at least one image layer of a container image comprising multiple image layers;
       compact the identified image layer by merging data of the identified layer with data of another image layer of the container image;
       transmit the data of the compacted image layer to a backup store remote from the machine node for storage; and
       recover the compacted image layer wherein the recovering step comprises:
          obtaining the compacted image layer from the backup store; and
          inserting the recovered compacted image layer back into a tree structure in the container image from which the recovered compacted image layer originally came at a position other than an original position.

12. The apparatus of claim 11, wherein the compacted image layer is stored in the backup store with an assigned universally unique identifier.

13. An article of manufacture for managing container images in a container hosting environment comprising a set of machine nodes for hosting container images, the article of manufacture comprising a processor-readable storage medium having stored therein program code of one or more software programs, wherein the program code is executable by a processing device to implement a method comprising:
    identifying for compaction, at a machine node of the set of machine nodes, at least one image layer of a container image comprising multiple image layers;
    compacting the identified image layer by merging data of the identified layer with data of another image layer of the container image;

transmitting the data of the compacted image layer to a backup store remote from the machine node for storage; and recovering the compacted image layer wherein the recovering step comprises:

obtaining the compacted image layer from the backup store; and inserting the recovered compacted image layer back into a tree structure in the container image from which the recovered compacted image layer originally came at a position other than an original position.

14. The article of manufacture of claim 13, wherein the compacted image layer is stored in the backup store with an assigned universally unique identifier.

15. The article of manufacture of claim 13, wherein the program code is further executable by the processing device to recover the compacted image layer.

16. The article of manufacture of claim 13, wherein the identifying step further comprises using a collected metric in accordance with a policy to identify the image layer of the container image to be compacted.

17. The article of manufacture of claim 13, wherein the other image layer to which the identified image layer is merged is a child node to the identified image layer.

18. The article of manufacture of claim 13, wherein the merged data is difference data relative to the identified image layer and the other image layer to which the identified image layer is compacted.

19. The article of manufacture of claim 13, wherein the compacted image layer is stored in the backup store with an assigned universally unique identifier.

20. The article of manufacture of claim 13, wherein the compacting step is transparent to one or more of a runtime environment and an end-user of the container image.

* * * * *